United States Patent
Schmitz

(10) Patent No.: US 6,710,471 B1
(45) Date of Patent: Mar. 23, 2004

(54) DEVICE AND METHOD FOR AUTHORIZATION INTERROGATION IN A MOTOR VEHICLE

(75) Inventor: Stephen Schmitz, Cologne (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/762,343

(22) PCT Filed: Aug. 3, 1999

(86) PCT No.: PCT/DE99/02361
§ 371 (c)(1),
(2), (4) Date: Apr. 18, 2001

(87) PCT Pub. No.: WO00/08280
PCT Pub. Date: Feb. 17, 2000

(30) Foreign Application Priority Data
Aug. 4, 1998 (DE) .......................... 198 35 155

(51) Int. Cl.$^7$ ..................... B60R 25/00; H01H 47/22; H04B 1/38
(52) U.S. Cl. ..................... 307/10.2; 340/5.61
(58) Field of Search ............... 307/10.1, 10.5, 307/10.4, 10.2; 340/5.61, 5.62, 5.1, 5.2, 5.8, 5.7, 5.71, 5.72, 5.73; 455/41

(56) References Cited

U.S. PATENT DOCUMENTS

| 4,987,643 A | * | 1/1991 | Powers et al. ............... 425/139 |
| 5,134,392 A | * | 7/1992 | Takeuchi et al. ........... 340/5.62 |
| 5,552,641 A | * | 9/1996 | Fischer et al. .............. 307/10.5 |
| 6,483,425 B1 | * | 11/2002 | Avenel ....................... 340/5.61 |

FOREIGN PATENT DOCUMENTS

| DE | 38 20 248 | | 1/1989 | |
| DE | 195 42 441 | | 5/1997 | |
| DE | 197 18 794 | | 8/1998 | |
| GB | 2307378 A | * | 5/1997 | ........... E05B/49/00 |
| WO | WO 9850652 A1 | * | 11/1998 | ........... E05B/49/00 |

OTHER PUBLICATIONS

Motoki Hirano et al., "Keyless Entry System With Radio Card Transponder", IEEE Transactions on Industrial Electronics, US, IEEE Inc., New York, vol. 35, No. 2, pp. 208–216 (ISSN: 0278–0046)*.

* cited by examiner

Primary Examiner—Gregory J. Toatley, Jr.
(74) Attorney, Agent, or Firm—Kenyon & Kenyon

(57) ABSTRACT

A device and a method for an authorization interrogation in a motor vehicle uses a transponder exchanges data with an antenna array within the framework of an authorization interrogation. During an external space interrogation, the antenna array is controlled using a current for the external space interrogation and, during an interior space interrogation, using a current for the interior space interrogation.

6 Claims, 3 Drawing Sheets

DEVICE AND METHOD FOR AUTHORIZATION INTERROGATION IN A MOTOR VEHICLE

FIELD OF THE INVENTION

The present invention concerns a device and a method for an authorization interrogation in a motor vehicle.

BACKGROUND OF THE INVENTION

The article "Keyless entry system with radio car transponder", by Motoki Hirano, Mikio Takeuchi, Takahisa Tomoda, Kin-Ichiro Nakano, published in the IEEE transactions on industrial electronics, Vol. 35, No. 2, May 1988, pages 208 through 216, describes a keyless entry system. In this system, a transponder carried by the user executes an access authorization dialog with an antenna arranged in the vehicle. An access authorization being or not being granted is based on the access authorization dialog. The antennas of the vehicle are arranged in the lateral rearview mirror housing and in the rear bumper.

However, this antenna array results in an increased cabling outlay since provision must be made for a data connection to the door controller generally arranged in the passenger compartment. The accommodation in the exterior mirror allows the external space to be interrogated without greater attenuation of the magnetic field.

SUMMARY OF INVENTION

An object of an exemplary embodiment of the present invention is directed to conveniently arranging an antenna only in the interior space and, at the same time, ensuring a trouble-free signal exchange with the transponder.

A device and/or method according to an exemplary embodiment and/or exemplary method of the present invention concerning an authorization interrogation system in a motor vehicle may have a transponder which exchanges data with an antenna array within the framework of an authorization interrogation. The antenna array can be composed of a left antenna array arranged on the left side of the motor vehicle and of a right antenna array arranged on the right side of the motor vehicle. During an external space interrogation, the left antenna array receives a current for the external space interrogation and the right antenna array receives a current for the external space interrogation. The currents of the left and of the right antenna arrays can be selected to have different magnitudes, to be different from zero and/or to have current phases selected to be inverted relative to each other. The antenna arrays can be accommodated in the lateral posts behind the right or left side-doors, respectively. Due to the spatial proximity of the antenna array to the vehicle locking system, the cabling outlay can be reduced. The different selection of the current magnitude or of the current phases (inverting control) of the left and right antenna arrays can contribute to an unequivocal transponder recognition on one of the two (right or left) sides of the motor vehicle. If, for example, the left external space of the motor vehicle is to be interrogated, a correspondingly high current is applied to the left antenna array. The left antenna array ensures the communication with the transponder, which is generally located on the left side. The right antenna array can be controlled using a lower current in an inverting manner with respect to the useful signal of the current of the left antenna array to compensate for the field which is radiated by the left antenna array toward the right side. This can be done in such a manner that a transponder possibly located on the right side of the vehicle cannot enter into a signal exchange with the base station. In this manner, manipulations can be reduced. Moreover, an unwanted communication of a transponder located on the left side with the right antenna array can be prevented as well. Because of the possibility of this active disturbance field compensation, the transmitting power of the antenna which interrogates the desired side area can be increased. The disadvantageous effects due to the unwanted emergence of the magnetic waves on the opposite vehicle side do not impair the reliability of the authorization interrogation.

In another exemplary embodiment of the present invention, an antenna can be provided in the antenna array to be used both for the external space interrogation and for an interior space interrogation. Due to this double use, the required component outlay is reduced. The interior space interrogation can be carried out for a driving authorization interrogation. The control of the left and right antenna arrays can be selected in such a manner that each one covers a half-space of the passenger compartment for transponder communication. For interior space monitoring, the two antenna arrays can be controlled successively. That is, each of the antenna arrays can cover the whole interior space.

In another exemplary embodiment of the present invention, the antenna array can be composed of at least two antennas which are aligned orthogonally relative to each other. In this manner, a rotating magnetic field can be generated so that a signal exchange with a transponder located in any arbitrary position is achieved.

The antenna used both for the interior space interrogation and for the external space interrogation is preferably designed as a ferrite coil or an air coil. In this manner, the magnetic fields needed for a reliable data exchange can be attained.

Another exemplary embodiment of the device and/or method according to the present invention for an authorization interrogation in a motor vehicle first queries an operating signal. Then, a current value for controlling an antenna array is selected as a function of the operating signal. Then, the antenna array is controlled using the selected current value for carrying out the authorization interrogation. A desired interrogation type, external space interrogation as access authorization, and interior space interrogation as driving authorization, can be allocated in a simple manner on the basis of the operating signals.

DETAILED DESCRIPTION

Figure 1:
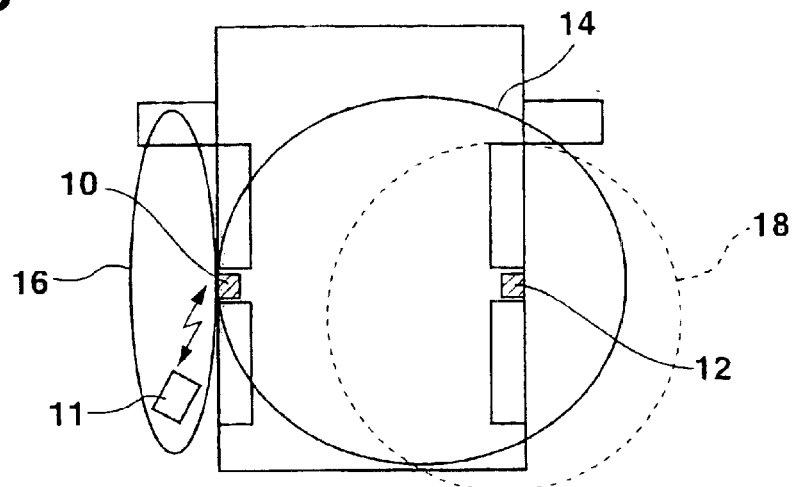
FIG. 1 shows a top view of a motor vehicle equipped with the device according to an exemplary embodiment of the present invention.

In FIG. 1, the left side of a motor vehicle is shown in a top view. In FIG. 1, left antenna array 10 is accommodated between the left front door and back door. During an external space interrogation of the left external space, left antenna array 10 may emit an antenna field 16 for the external space interrogation on the left and an antenna field 14 oriented toward the interior space. Within antenna field 16 for the external space interrogation on the left, a transponder 11 is located there and the transponder 11 may exchange signals with left antenna array 10. Antenna field 14, which is oriented toward the interior space, reaches beyond the right side of the motor vehicle. Thus, this field reaching beyond can be equalized by a compensating field 18 for the external space interrogation on the left, generated by a right antenna array 12.

Figure 2:
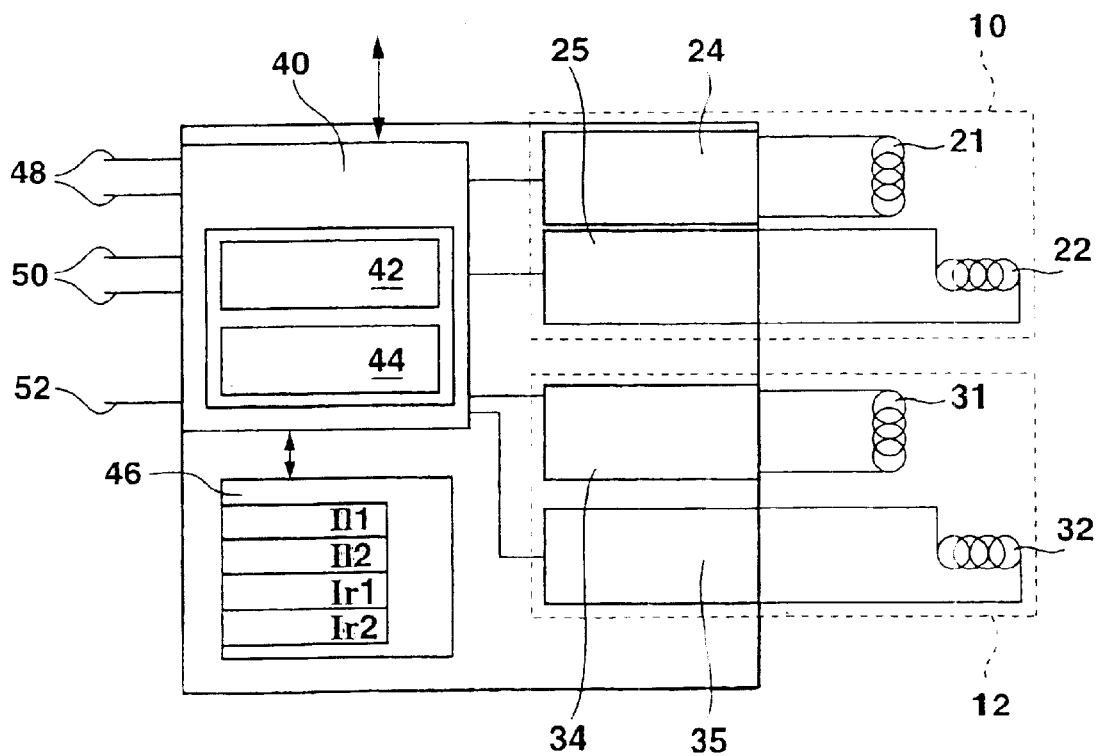
FIG. 2 shows a block diagram of another exemplary embodiment of the present invention.

In FIG. 2, left antenna array 10 is composed of a first left antenna 21 and a second left antenna 22 arranged orthogonally relative to each other. First left antenna 21 is controlled by a driver 24 for the first left antenna, second left antenna 22 is controlled by a driver 25 for the second left antenna. Right antenna array 12 is composed of a first right antenna 31 and a second right antenna 32 arranged orthogonally relative to each other. The right antenna array 12 further includes an appertaining driver 34 for the first antenna on the right and a driver 35 for the second antenna on the right. Drivers 24, 25, 34, 35 exchange signals with a controller 40. In controller 40, provision is made for an interior space logic 42 and an external space logic 44 for carrying out interior space monitoring and external space monitoring. Controller 40 exchanges signals with a memory 46 in which a current Il1 of first left antenna 21, a current Il2 of second left antenna 22, a current Ir1 of first right antenna 31, and a current Ir2 of second right antenna 33 are stored. Two opening signals 'left doors' 48, two opening signals 'right doors' 50, and an engine starting signal 52 are fed to controller 40 as further input variables.

Figure 3:
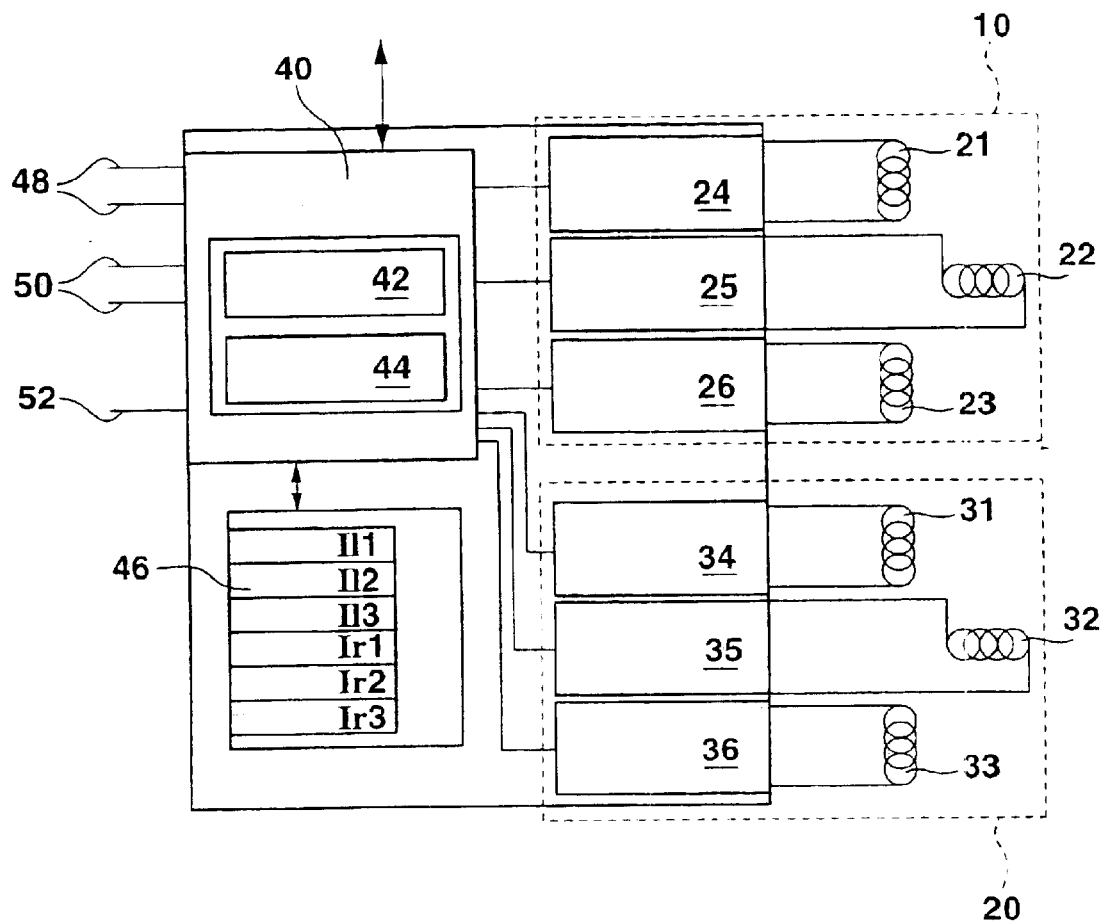
FIG. 3 shows a block diagram of another exemplary embodiment of the present invention.

In FIG. 3, the exemplary embodiment differs from the exemplary embodiment of FIG. 2 in that the left antenna array 10 is expanded by a third left antenna 23 and an appertaining driver 26 for the third left antenna 23. Right antenna array 12 also has a third right antenna 33 and an appertaining driver 36 for the third right antenna 33. Further, in FIG. 3, a current Il3 of third left antenna 23 and a current Ir3 of third right antenna 33 are also stored in memory 46.

Figure 4:
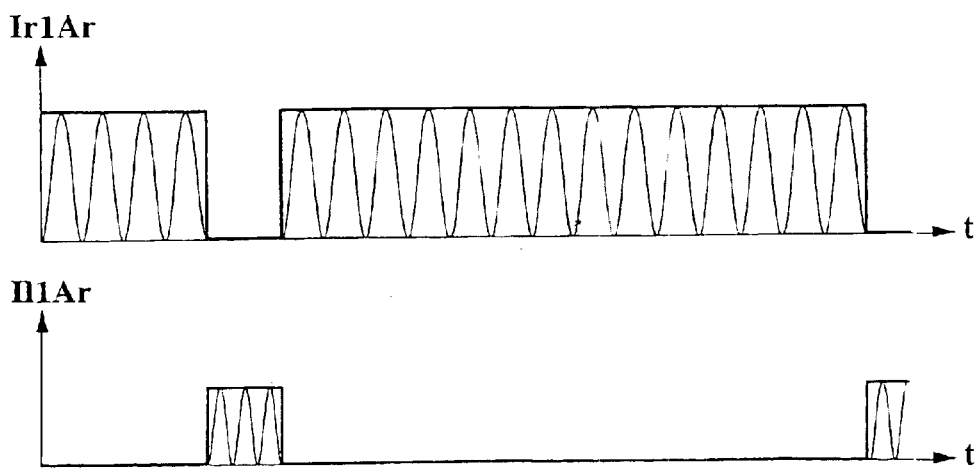
FIG. 4 shows a signal pattern generated according to an exemplary embodiment of the present invention.

FIG. 4 shows the time characteristic of a current Ir1Ar of the first right antenna for the external space interrogation on the right external space and a current Il1Ar of the first left antenna for the external space interrogation on the right. The signal patterns of these two currents are binary-inverted. The sketched rectangles (binary signal) are the envelopes of the sinusoidal current characteristic.

Left and right antenna arrays 10 and 12 are accommodated in the so-called "B-pillar" of the motor vehicle, which, in case of a four-door vehicle, can be located between the two side doors. At least one antenna of the respective antenna array 10, 12 is used both for the interior space interrogation and for the external space interrogation. In FIG. 2, the two antennas 21, 22 or 31, 32 of each antenna array 10 or 12, respectively, can be used both for the interior space and for the external space interrogations. In FIG. 3, second antennas 22 or 32 of antenna arrays 10 or 12, respectively, can be controlled both during the interior space and during the external space interrogations.

In another exemplary embodiment of the present invention, during an external space interrogation, the respective antenna arrays 10, 12 of the interrogated side and transponder 11 can exchange signals. If a driver wants to enter the vehicle, the driver may operate the door handle on the left side. A corresponding opening signal 48 'left doors' activates the corresponding external space logic 44 in controller 40 for the left external space interrogation. The left antenna array 10, via antenna field 16 for the external space interrogation on the left, transmits an encoded signal to transponder 11 which thereupon returns a response signal to left antenna array 10. This response is evaluated in a control unit, possibly in controller 40, and compared to a response, e.g., a predetermined response, which is considered as premissible. In case of a match, the locking system of the motor vehicle can be controlled along the lines of an opening. Because of the security requirements, the data exchange between transponder 11 and antenna arrays 10, 12 can be executed in an encrypted manner, for example according to the so-called "Challenge-Response Method" or to the "Rolling Code Method".

Since at least one antenna of antenna arrays 10, 12 can be used both for the interior space and for the external space interrogations, the field distribution shows in FIG. 1 can arise in response to controlling left antenna array 10 for a left external space interrogation. In this connection, antenna field 16 for the external space interrogation on the left, which is located on the left vehicle side, is desired; whereas antenna field 14, which is oriented toward the interior space and which can also extend over the right vehicle side, is not desired. The exemplary device according to the present invention is configured to prevent antenna field 14, which is oriented toward the interior space and which emerges on the right vehicle side in this constellation, from being used for the communication with a transponder 11 located on the right vehicle side. During an external space interrogation on the left, only transponder 11 located on the left side should bring about an access authorization but not a transponder 11 located on the right side. To achieve this, right antenna array 12 can transmit an interference field 18 for the external space interrogation on the left. The generation of this interference field 18 can be selected in such a manner that during the superimposition of interference field 18 and antenna field 14, which is oriented toward the interior space, a resulting field arises on the right side which no longer contains the interrogation information of left antenna array 10 for transponder 11 which is typical of the left side. The information exchanged with transponder 11 is generally binary-encoded in conjunction with a sinusoidal carrier signal of, for example, 125 kHz. See, for comparison, FIG. 4. This binary-encoded information can be interfered with by interference field 18 on the right side in such a manner that, for example, a continuous field without 0/1 change arises there. The right antenna array 12 can be controlled in a logically inverting manner with respect to the useful signal of left antenna array 10, as shown in an exemplary embodiment of FIG. 4, so that, given a suitable selection of the coil current amplitude (current peak-peak of the carrier signal), a continuous field arises on the right side. This can make it more difficult to control a transponder 11 located on the right side. To generate interference field 18, right antenna array 12 can also be controlled along the lines of noise or in a manner that it is out-of-phase relative to the current of the useful side. The current amplitudes can be stored in memory 46 for each antenna and interrogation type.

At least one of the antennas of antenna arrays 10, 12 can also be used for an interior space interrogation. If the user provided with a transponder 11 has obtained access to the vehicle and wishes to start the vehicle, the user can actuate a corresponding operating control element to generate engine starting signal 52. Controller 40 detects engine starting signal 52 and decides on the basis thereof to activate interior space logic 42 along the lines of the interior space interrogation. Again, antenna arrays 10, 12 carry out a signal exchange with transponder 11 located in the interior space. If transponder 11 returns a signal which is considered as valid, the user is identified as authorized to drive. The components necessary for the operation of the vehicle can then be released. Left and right antenna arrays 10, 12, which each cover the whole interior space may be controlled in succession.

According to the exemplary embodiment of the present invention shown in FIG. 2, first and second antennas 21, 31, and 22 respectively can be controlled both for the interior space interrogation and for the external space interrogations on the right/on the left. Three operating modes can be distinguished for each antenna. In memory 46, one current value (coil current amplitude peak-peak) can be stored for each of these three operating modes, respectively. Current Il1 of first left antenna 21 can have three values: the current of the left first antenna for the external space interrogation on the left (Il1Al); the current of the first left antenna for the external space interrogation on the right (Il1Ar); and the current of the left first antenna for the interior space interrogation (Il1I). This also applies to further antennas 22, 31, 32. During the external space interrogation on the left, the signal exchange with transponder 11 is executed, inter alia, via the first left antenna 21. Current Il1Al stored for this operating mode has a relatively high value. In the second operating mode external space interrogation on the right, first left antenna 21 generates an interference field for the external space interrogation on the right. Corresponding current value Il1Ar should be selected to be lower than that for the external space interrogation on the left. The corresponding signal patterns for the external space interrogation on the right for one exemplary embodiment of the present invention shown in FIG. 4. For the third operating mode of the interior space interrogation, a current Il1I must be selected in the magnitude that the whole interior space of the motor vehicle is covered reliably.

The other current values should be stored in a corresponding manner. For first right antenna 31, for example, the current for the external space interrogation on the left Ir1Al should be selected to be smaller than that for the external space interrogation on the right (Ir1Ar).

According to the exemplary embodiment as shown in FIG. 3, second antenna 22 or 32, respectively, should always be used both for the interior space interrogation and for the external space interrogation. Corresponding to the antennas according to FIG. 2, these second antennas 22, 32, in turn, must cover three operating modes including the appertaining three current values so that for each of the second antennas 22, 32, three current values (Il2Al, Il2Ar, Il2I; Ir2Al, Ir2Ar, Ir2I) are stored, respectively. First antennas 21, 31 should be used for the external space interrogation on the right/on the left so that two current values should be stored for this in memory 46, respectively, for generating a useful field, and/or for generating an interference field. Third antennas 23, 33, together with second antennas 22, 32, take over only the interior space interrogation. For this, only one current value (Ir3I, Il3I) is to be stored in memory 46, respectively. First antennas 21 for the external space interrogation can be air coils which, in conjunction with second antennas 22, 32, form so-called "twin-loop" antennas. First and second antennas 21 or 31, 22 or 32 are respectively controlled in phase quadrature so that a rotating magnetic field arises. Ferrite coils can be used as second antennas 22, 32. The ferrite coils of second antennas 22, 32 are mounted in the B-pillars. Third antennas 23, 33 for the interior space interrogation, are also ferrite antennas and can be arranged at the floor, for example, at the drivers seat.

Figure 5:
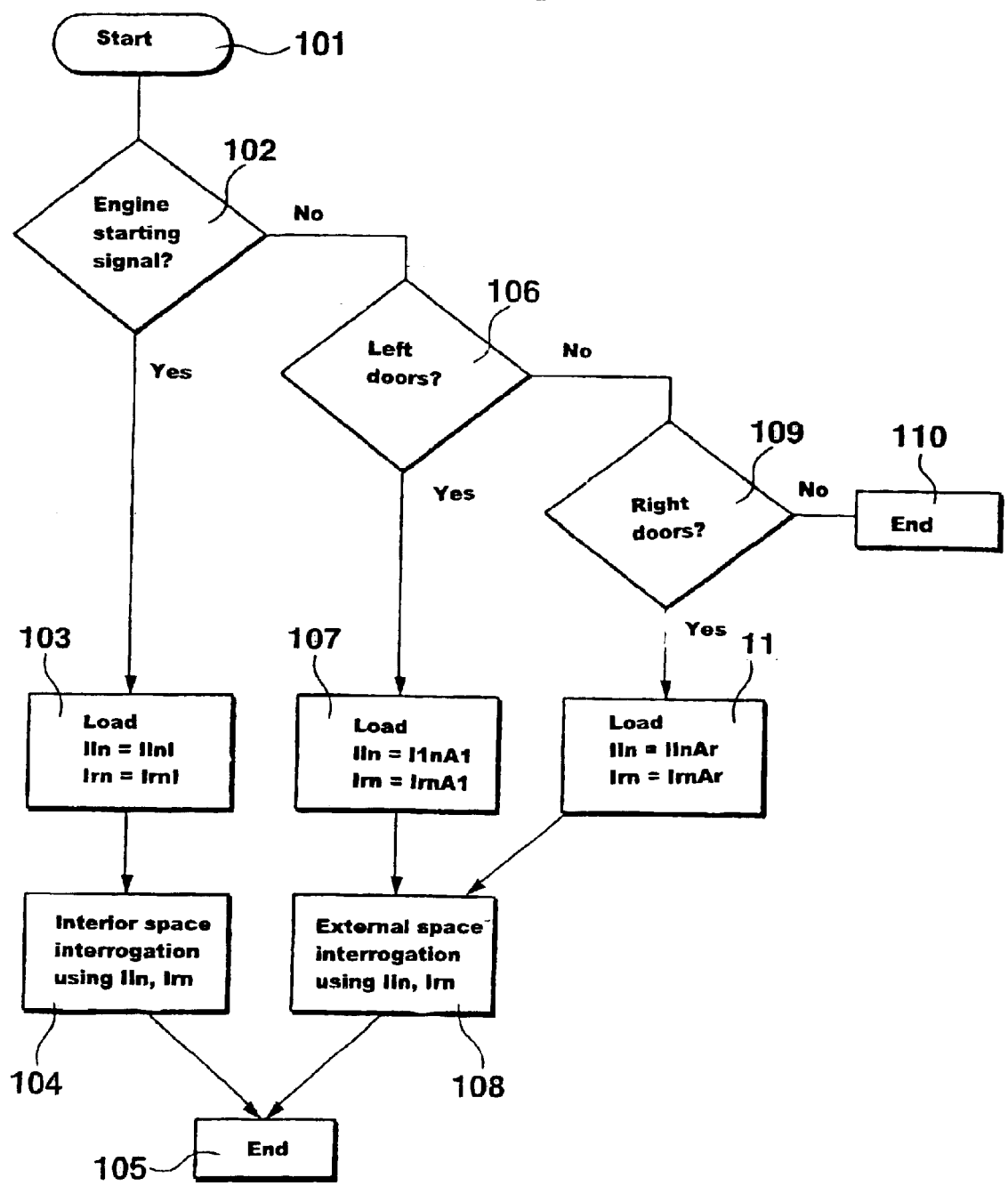
FIG. 5 shows a flow chart of the method according to an exemplary embodiment of the present invention.

FIG. 5 depicts the functional sequence of the operating method of a device according to the present invention. The interrogations are started, step 101, in that the controller detects a signal change of an input signal (opening signal 48/50 'left/right doors', engine starting signal 52). The three operating modes (external space interrogation on the right/ on the left, interior space interrogation) are to be allocated to these input signals. During interrogation 102, it is ascertained whether the input signal producing a signal change is engine starting signal 52. In the event of an affirmative answer, controller 40 loads current values for the interior space interrogation (IlnI, IrnI) from memory 46, step 103. Index n is to be understood as sequential index; for the exemplary embodiment according to FIG. 2 it applies that n=1,2; for the exemplary embodiment according to FIG. 3 it applies that n=1,2,3.

Subsequently, the interior space interrogation is carried out using the values loaded from memory 46, step 104.

If the incoming signal is not engine starting signal 52, an interrogation 106 follows to determine whether the left doors were actuated. If this is the case, the controller recognizes that the external space interrogation on the left is to be started. The controller loads current values for the external space interrogation on the left IlnAl, IrnAl from memory 46, step 107. If the left doors were not actuated, an actuation of the right doors is interrogated, step 109. In the event of an affirmative answer, the external space interrogation on the right is to be carried out. Corresponding current values IlnAr, IrnAr are to be loaded from memory 46. The external space interrogation is carried out using current control values Iln, Irn selected in this manner, step 108. As a function of a signal change considered as permissible, either a driving authorization (during the interior space interrogation) or an access authorization (during the external space interrogation) is awarded, step 105.

What is claimed is:

1. A device for providing an authorization interrogation in a motor vehicle having a right side and a left side, the device comprising:

a transponder for use on a left external space side of the motor vehicle and for exchanging of data with at least one of a left antenna array arranged on the left side of the motor vehicle and a right antenna array arranged on the right side of the motor vehicle;

wherein the left antenna array receives a current for an external space interrogation on the left side during an external space interrogation on the left, and the right antenna array receives the current for the external space interrogation on the left side during an external space interrogation on the left for generating an interference field on a right external space side, the interference field preventing the exchanging of the data with the transponder on the right external space side.

2. The device of claim 1, wherein, during the external space interrogation on the left, the left antenna array and the right antenna array are controlled so that one current of the left antenna array is inverted relative to another current of the right antenna array.

3. The device of claim 1, wherein at least one antenna of the at least one of the left antenna array and the right antenna array is used for an interior space interrogation and the external space interrogation.

4. The device of claim 1, wherein the locking system of the motor vehicle is controllable as a function of at least one of the external space interrogation and an interior space interrogation, and an engine starting system of the motor vehicle is releasable as a function of the interior space interrogation.

5. The device of claim 1, wherein at least one of the right antenna array and the left antenna array is mounted in a body pillar adjacent to a side door of the motor vehicle.

6. A method for providing an authorization interrogation in a motor vehicle, the method comprising the steps of:

using a transponder to exchange data with at least one antenna array arranged on at least one of a left side and a right side of the motor vehicle;

querying an operating signal;

selecting a current value as a left side current value and a right side current value for controlling the antenna array as a function of the operating signal so that the left side current value is different than the right side current value for external space interrogation on the left side of the motor vehicle and on the right side of the motor vehicle; and controlling the at least one antenna array using the at least one current value to perform the authorization interrogation for one of the external space interrogation on the left side and on the right side of the motor vehicle.

* * * * *